United States Patent [19]

Patel et al.

[11] Patent Number: 5,674,438

[45] Date of Patent: Oct. 7, 1997

[54] PROCESS FOR PREPARATION OF METAL CARBIDE FIBERS

[75] Inventors: Kundan M. Patel, Landing; Frank Mares, Whippany; Joseph E. Mackey, E. Hanover; Richard S. Hatami, Millburn, all of N.J.

[73] Assignee: AlliedSignal Inc., Morris Township, N.J.

[21] Appl. No.: 378,682

[22] Filed: Jul. 12, 1989

[51] Int. Cl.$^6$ ................... D01C 5/00; D01F 6/18
[52] U.S. Cl. .............. 264/29.2; 264/29.6; 264/182; 264/210.6
[58] Field of Search ................... 264/29.2, 29.6, 264/211, 182, 210.6, 210.8, 211.16

[56] References Cited

U.S. PATENT DOCUMENTS

| 3,713,865 | 1/1973 | Leeds | 264/29.2 |
| 4,126,652 | 11/1978 | Oohara et al. | 264/29.6 |

FOREIGN PATENT DOCUMENTS

| 60-059116 | 4/1985 | Japan | 264/29.2 |
| 60-155713 | 8/1985 | Japan | 264/29.2 |
| 63-092725 | 4/1988 | Japan | 264/29.2 |

*Primary Examiner*—Peter A. Nelson
*Attorney, Agent, or Firm*—Gerhard H. Fuchs; Richard C. Stewart

[57] ABSTRACT

This invention relates to a process for forming metal or non-metal carbide fiber from the corresponding metal or non-metal.

26 Claims, 4 Drawing Sheets

PROCESS FOR PREPARATION OF METAL CARBIDE FIBERS

BACKGROUND OF THE INVENTION

1. Field of the Invention

This invention relates to a process for preparation of metal and non-metal carbide fibers. More particularly, this invention relates to a process for preparation of metal and non-metal carbide fibers having improved properties.

2. Prior Art

In the automotive and the aerospace industries, there is a need for fiber reinforced light metal alloys based on aluminum, magnesium, titanium or titanium-aluminide, and for fiber reinforced, and toughened ceramic materials. Such composites have the potential for reducing weight and/or providing higher heat resistances, and better strength and stiffnesses. In some cases these composites also provide superior toughness and fatigue resistance. Development of these advanced composite materials requires, however, fine diameter ceramic fibers, which can retain in adequate strength well above 1000° C.

An improved process for manufacturing metal carbide products is described in U.S. Pat. No. 4,126,652. In that process, a metal carbide containing molded product is formed by heating a composition comprising a powdery metal and an acrylonitrile polymer to a temperature of about 200° C. to 400° C., and then calcining the resulting product at a temperature of from about 900° C. to 2500° C. in an inert atmosphere. This process suffers from a number of inherent disadvantages. For example, this process is not suitable for preparation of metal carbide fibers because fibers prepared by this process lack sufficient strength and density. Other disadvantages include large number of voids or pores, and low or no thermal stability. Fibers prepared in accordance with the process of this patent are unsuitable for fiber reinforcement for metals and plastics.

SUMMARY OF THE INVENTION

The present invention relates to a process for forming metal carbide fibers. In general, the invention is directed to a process for the preparation of metal and non-metal carbide fibers, said process comprising the steps of:

(a) stabilizing a fiber comprising at least a stoichiometrically equivalent amount of an acrylonitrile polymer of fiber forming molecular weight having uniformly or substantially uniformly dispersed therein one or more metals or non-metals selected from the group consisting of B, Ti, Si, and W in particulate form having an average particle size equal to or less than about 5 um, a sintering effective amount of one or more effective sintering aids and a grain growth preventive amount of one or more grain growth preventive agents, said fiber substantially free or free of voids having an average size greater than about 1 um by heating said fiber at a temperature in an oxidizing atmosphere for a time sufficient to form said stabilized fiber;

(b) carbonizing said stabilized fiber by heating said fiber at a temperature in an inert or substantially inert atmosphere for a time sufficient to form a carbonized fiber comprising carbon and said metals or non-metals;

(c) reacting said carbon and said metals or non-metals in said carbonized fiber by heating said fiber in an inert temperature atmosphere or substantially inert atmosphere at a temperature and for a time sufficient to form a fiber comprising the metal or non-metal carbide having a density of at least about 60% of the theoretical density of said metal or non-metal carbide; and (d) sintering said fiber comprising said metal or non-metal carbide by heating said fiber in an inert atmosphere or substantially inert atmosphere other than nitrogen for a time and at a temperature sufficient to form a metal or non-metal carbide fiber having a density of greater than about 70% of the theoretical density of the metal or non-metal carbide.

The preferred embodiment of this invention relates to a process for forming such fibers which comprises:

(a) forming a solution of at least a stoichiometrically equivalent amount of an acrylonitrile polymer of fiber-forming molecular weight in a first solvent, said solution having dispersed therein one or more metals or non-metals selected from the group consisting of B, Ti, Si, and W, a sintering effective amount of one or more effective sintering aids and a grain growth preventive amount of one or more grain growth preventive agents, said metals or non-metals, sintering aids and grain growth preventive agents in particulate form having an average particle size equal to or less than about 5 um.

(b) extruding said solution through a spinneret into a quench liquid comprising said first solvent and a liquid which is miscible in said first solvent and in which said polymer is insoluble or substantially insoluble to form a fiber containing said first solvent;

(c) extracting said fiber containing said first solvent with a second solvent to form a fiber which is free or substantially free of first solvent and which is free or substantially free of voids having a size greater than about 0.5 um, said extracted fiber having a substantially uniform or uniform distribution of said metals or non-metals, sintering aids and grain growth preventive agents in said fiber;

(d) stretching at least one of:
   (i) the fiber containing the first solvent, and
   (ii) the extracted fiber;

(e) stabilizing said extracted fiber by heating said fiber at a temperature of from about 125° C. to about 325° C. in an oxidizing atmosphere for a time sufficient to form said stabilized fiber;

(f) carbonizing said stabilized fiber by heating said stabilized fiber in an inert or substantially inert atmosphere at a temperature and for a time sufficient to form a carbonized fiber comprising carbon and said metals or non-metals, sintering aids and grain growth preventive agents;

(g) reacting said carbon and said metals or non-metals in said carbonized fiber by heating said fiber in an inert or substantially inert atmosphere at a temperature and for a time sufficient to form a fiber comprising the metal or non-metal carbide having a density of at least about 60% of the theoretical density of said metal or non-metal carbide; and (h) sintering said fiber comprising said metal or non-metal carbide by heating said fiber in an inert or substantially inert atmosphere for a time and at a temperature sufficient to form a metal or non-metal carbide fiber having a density of greater than about 85% of the theoretical density of the metal carbide.

The metal or non-metal carbide containing fibers of this invention exhibit improved properties such as improved density and tensile strength.

BRIEF DESCRIPTION OF THE DRAWINGS

The invention will be more fully understood and further advantages will become apparent when reference is made to the following detailed description of the invention and the accompanying drawings in which.

DETAILED DESCRIPTION OF THE INVENTION

Figure 1:
FIGS. 1 and 2 are photographs of cross-sections of the polyacrylonitrile fiber of Example I having dispersed silicon and boron taken by a scanning electron microscope (SEM).

The first step of the process of this invention, comprises stabilizing a fiber substantially free of voids having an average size greater than about 1 um comprising an acrylonitrile polymer of fiber-forming molecular weight having uniformly or substantially uniformly dispersed therein an effective amount of one or more metals selected from the group consisting of B, Ti, Si, and W, a sintering effective amount of one or more effective sintering aids and a grain growth preventive effective amount of one or more grain growth preventive agents, said metals or non-metals, sintering aids, and grain growth preventive agents in particulate form having a particle size equal to or less than about 5 um and dispersed uniformly or substantially uniformly in said fiber by heating said fiber at a temperature in an oxidizing atmosphere for a time sufficient to form said stabilized fiber.

As used herein, "stabilization" is the oxidative conversion and thermal cyclization of the acrylonitrile polymer in said fiber into completely or partially crosslinked and cyclized infusible organic matrix. Stabilization is carried out for a time and at a temperature sufficient to form a stabilized fiber. If the stabilization step is carried out too long or at too high a temperature, there is a reduction in the amount of carbon available in the subsequent steps for reaction with the dispersed metals which may result in metal carbide fibers having dispersed unreacted metal. Conversely, if the stabilization step is carried out at too low a temperature or for too short a period of time, hollow fibers may result upon carbonization. In the stabilization step of the process of this invention, the fiber is usually stabilized by heating at a temperature of from about 125° C. to about 350° C. in an oxidizing atmosphere for a time sufficient to form the stabilized fiber usually from about 0.25 hrs. to about 4.5 hrs. In the preferred embodiments of the invention, the fiber is stabilized by heating at a temperature of from about 135° C. to about 350° C. in an oxidizing atmosphere for a period of from about 0.5 hrs. to about 4.0 hrs. In the particularly preferred embodiments of the invention, the fiber is stabilized by heating at a temperature of from about 150° C. to about 325° C. in an oxidizing atmosphere for a period of from about 1 hr. to about 3.5 hrs. Amongst these particularly preferred embodiments most preferred are those embodiments in which the fiber is stabilized by heating in an oxidizing atmosphere at a temperature of from about 170° C. to about 300° C. for a period of from about 2 hrs. to about 3 hrs.

In the preferred embodiments of this invention, stabilization is carried out by heating the fiber at a number of different temperatures which allows for control over the rate of oxidative crosslinking and thermal cyclization so that the fiber will not over oxidize or decompose. For example, if the initial temperature is too high the reactions may occur too fast and the fiber may break. In these preferred embodiments, the fiber is usually initially heated at a temperature at the low end of the useful temperature range as for example at a temperature of from about 125° C. to about 175° C. for a period of from about 0.5 to about 1 hr., and thereafter the temperature is increased gradually at a constant or substantially constant rate, or step wise to a temperature in the high end of the range, as for example at temperatures of from about 175° C. to about 350° C. In these preferred embodiments for the preparation of silicon carbide using silicon, the fiber is stabilized by initial heating at a temperature of about 150° C. for from about 0.25 to about 1.5 hr., followed by heating at a temperature of about 225° C. for from about 0.25 hr. to about 1.5 hr., heating at a temperature of about 250° C. for from about 0.25 hr. to about 1.5 hr. and heating at a temperature of about 285° C. for from about 0.25 hr. to about 1.5 hr. In the particularly preferred embodiments of the invention, stabilization is carried out by heating the fiber at an initial temperature of from about 130° C. to about 190° C. for a period of from about 0.25 hr. to about 1.5 hr., and thereafter increasing the stabilization temperature either gradually at a constant or substantially constant rate, or stepwise to one or more temperatures of from about 200° C. to about 325° C.; and in the most preferred embodiments of the invention the stabilization is carried out by heating the fiber at an initial temperature of from about 150° C. to about 180° C. and thereafter increasing the stabilization temperature either gradually (at a constant or substantially constant rate) or step wise to a temperature of from about 200° C. to about 300° C.

During stabilization the fiber shrinks linearly and radially which may adversely affect the molecular orientation in the fiber which consequently may affect the carbonization and metal or non-metal carbide reaction product of subsequent steps. During stabilization, linear shrinkage is controlled by maintaining the fiber under tension through manipulation of the ratio of the fiber input rate into the furnace to output rate of the fiber out of the furnace. In general, the ratios should be maintained such that shrinkage is less than about 25%. In the preferred embodiments of the invention, the ratios are maintained such that shrinkage is less than about 20%, and in the particularly preferred embodiments the ratios are maintained such that shrinkage is less than 15%. Amongst these particularly preferred embodiments, most preferred are those embodiments in which the input to output ratios are such that shrinkage is less than about 10%.

Stabilization can be carried out using conventional techniques and furnaces for carbonization of acrylonitrile polymers. Illustrative of such techniques and apparatus are those described in "Carbon Fiber" by Jean Baptiste Bonnet and Roop Chand Bansal, International Fiber Science Technology Series, Vol. 3, Marcel Dekker, Inc., New York, N.Y. 1984.

The fiber used in the stabilization step preferably does not include voids greater than about 0.1 um in size. In the particularly preferred embodiments of this invention, the fiber does not include voids greater than about 0.05 um in size and in the most preferred embodiments of this invention any voids that may be present are less than about 0.025 um in size, with fibers substantially free of voids being the fibers of choice.

The deniers, tenacity and tensile modulus of the fiber may vary widely. In the preferred embodiments of the invention, the denier of the fiber is from about 5 to about 85, the tenacity of the fiber is at least about 0.5 g/denier (68 MPa) and the tensile modulus of the fiber is at least about 25 g/denier (3.4 GPa). In the particularly preferred embodiments of the invention fiber denier is from about 10 to about 50, fiber tenacity is from about 0.5 g/denier (68 MPa) to about 4.0 g/denier (413 MPa), and tensile modulus is from about 25 g/denier (3.4 GPa) to about 150 g/denier (20.7 GPa), and in the most preferred embodiments of the invention the denier of the fiber is from about 10 to about 40, the tenacity of the fiber is from about 0.8 g/denier (110 MPa) to about 3 g/denier (550 MPa) and the tensile modulus of the fiber is from about 35 g/denier (4.82 GPa) to about 100 g/denier (13.87 GPa).

Acrylonitrile polymers for use in the practice of this invention includes acrylonitrile homopolymers and copolymers containing not less than about 80 mole %, preferably not less than about 85 mole %, more preferably not less than about 90 mole % of and most preferably not less than about 94 mole % of acrylonitrile based on the total of moles of recurring monomeric units. When the acrylonitrile polymer is a copolymer, the other monomeric units may be derived from any monomer which is copolymerizable with acrylonitrile and which includes pendant groups containing active hydrogen or such groups which can be converted into pendant groups containing active hydrogen on heating. Illustrative of such groups are those of the formula:

$$R_1R_2C=CH_2$$

wherein:

$R_1$ and $R_2$ are the same or different and are hydrogen, hydroxy, amine, amide, cyano carboxy or alkoxycarbonyl. Illustrative of such monomers are styrene, ethylene, propylene, 1-octadecene, isobutylene, 1-pentene, 4-methoxystyrene, 3-methyl-1-hexene, 4-methylpentene, vinyl acetate, acrylic acid, methacrylic acid, methyl acrylate, tert-butylacrylate, butyl acrylate, isobutyl acrylate, vinyl propionate, vinyl isopropenyl ketone, propyl methacrylate, acrylamide, phenyl methacrylate, isobutyl methacrylate, sec-butyl methacrylate, ethyl acrylate, 2-hydroxyethyl acrylate, itaconic acid, allylamine, 1-methylstyrene, N,N-dimethylacrylamide, vinylidene cyanide, methacrylonitrile, 1-cyanovinyl acetate, allyl alcohol, methallyl alcohol and the like.

In the preferred embodiments of the invention, copolymerizable monomers are acrylic acid, methacrylic acid and their ester derivatives, and acrylamide and its derivatives. In the particularly preferred embodiments of the invention, copolymerizable monomers are acrylic acid, methacrylic acid and their derivatives. In the most preferred embodiments of the invention, the acrylonitrile polymer of choice is polyacrylonitrile.

The molecular weight of the acrylonitrile polymer may vary widely, the only requirement is that the polymer is of fiber forming molecular weight. Such a molecular weight is well known to those of skill in the art and is usually at least about 10,000. In the preferred embodiments of the invention the molecular weight of the polymer is from about 20,000 to about 1,200,000, and in the particularly preferred embodiments of the invention the molecular weight of the polymer is from about 50,000 to about 500,000. Amongst these particularly preferred embodiments, most preferred are those embodiments in which the molecular weight of the polymer is from about 100,000 to about 200,000.

An amount of the polymer is used which is "stoichiometrically equivalent" to the amount of metals or non-metals employed. As used herein a "stoichiometrically equivalent" amount of the polymer is an amount of the polymer which under process conditions is sufficient to form an amount of carbon (on carbonization of the polymer to carbon in the carbonization step) at least sufficient to react with all or substantially all of the metals or non-metals to convert same to the corresponding metal or non-metal carbide. For example, using silicon as the non-metal, the reaction of carbon and elemental silicon is as follows:

$$Si + C \rightarrow SiC$$

In this reaction, one equivalent of silicon reacts with one equivalent of carbon to produce one equivalent of silicon carbide. In this example, the amount of polyacrylonitrile polymer employed is sufficient on carbonization to form an amount of carbon which is sufficient to react with all or substanntially all of the silicon present in accordance with the above described stoichiometry. The stoichiometrically equivalent amount of polymer employed in any situation will vary widely, depending on a number of factors as for example, the efficiency of the carbonization step, the form of the metal and the like. The greater the efficiency of the carbonization step, the lesser the stoichiometrically equivalent amount of polymer required.

In the preferred embodiments of this invention the amount of polymer employed is from about a stoichiometrically equivalent amount of the polymer to about a stoichiometrically equivalent amount plus and amount of the polymer sufficient on carbonization to provide an excess of up to about 5 wgt. % of carbon based on the amount of carbon required to react with all of the metals or non-metals in the fiber to form the corresponding metal or non-metal carbide. In the particularly preferred embodiments of the invention, the amount of polymer employed is from about a stoichiometrically equivalent amount to about an stoichiometrically equivalent amount of the polymer plus an amount of the polymer sufficient on carbonization to provide an excess of carbon of from about 0.25 to about 3 wgt. %. In the most preferred embodiments of the invention, the amount of polymer employed is from about a stoichiometrically equivalent amount to about an stoichiometrically equivalent amount of the polymer plus an amount of the polymer sufficient on carbonization to provide an excess of carbon of from about 0.5 to 3 wgt. % with a stoichiometrically equivalent amount of the polymer plus an amount of the polymer which on carbonization is sufficient to provide an excess of carbon of from about 1 to about 2 wgt. % being the amount of choice.

The fiber contains one or more metals selected from the group consisting of B, Ti, Si, and W The preferred metal or non-metal for use in the practice of this invention is silicon.

The metals or non-metals are in particulate form having a particle size equal to or less than about 5 um. The lower limit for particle size is not critical, and usually the smaller size particles are preferred because the size of voids in the fiber formed from the reaction of the metal or non-metal and the carbon is directly proportional to the size of the particles. In the preferred embodiments of this invention, particle size is equal to or less than about 0.3 um and in the particularly preferred embodiments particle size is from about 0.01 um to about 0.3 um. In the most preferred embodiments, metal particle size is from about 0.01 um to about 0.1 um.

The fiber also contains a sintering effective amount of an effective sintering aid which promotes the sintering of the metal or non-metal carbide during the sintering step. As used herein an "effective sintering aid" is a one or more metals and/or metal compounds which upon sintering are effective to promote the diffusibility of the metal or non-metal carbide to increase the density of the metal or non-metal carbide and as used herein, "a sintering effective amount" of an effective sintering aid is an amount of such aid which is effective to promote the diffusibility of the metal or non-metal carbide on heating and to increase the density of the metal or non-metal carbide to any extent. The fiber also includes a "grain growth preventive amount" of one or more "effective grain growth preventive agents". Also, as used herein, "grain growth preventive agents" are one or more metals and/or metal compounds which upon sintering are effective to prevent or retard grain growth to minimize crystallite size in the metal or non-metal carbide, and as used herein a "grain growth preventive amount" of a grain growth preventive agent is an amount sufficient to prevent grain growth of the metal or non-metal carbide to any extent. Any material which is effective to function as a sintering aid and/or a grain growth preventive agent can be used. In the preferred embodiments of the invention, a material functions as both a sintering aid and a grain growth preventive agent. Illustrative of such effective sintering aids and grain growth preventive agents are boron, boron carbide, aluminum, aluminum oxide, titanium nitride, titanium boride, aluminum nitride, and yttrium oxide or any organic or inorganic precursor materials which form any of the foregoing under process conditions in particulate form having a particle size of less than about 5 um. Preferred sintering aids and grain growth preventive agents for use in the practice of this invention will vary with the metal carbide formed. In the preferred embodiments of the invention where silicon carbide is formed, sintering aids and grain growth preventive agents are selected from the group consisting of boron, boron carbide, aluminum, aluminum oxide, titanium nitride, titanium boride, aluminum nitride in particulate form having an average particle size equal to or less than about 3 um, preferably equal to or less than about 1 um.

The amount of sintering aids and grain growth prevention agents may vary widely. In general, the amount employed is equal to or less than about 5 wgt. % by weight of the metal or non-metal carbide present in the metal or non-metal carbide fiber resulting from the reacting step. In the preferred embodiments of the invention, the amount of sintering aids and grain growth preventive agents is equal to or less than about 2 wgt. % by weight of metal or non-metal carbide present in the metal or non-metal carbide fiber and in the particularly preferred embodiments of the invention, the amount of said aids and agents is equal to or less than about 1.5 wgt. % on the aforementioned basis.

The fiber for use in the practice of this invention can be prepared using conventional fiber forming techniques. For example, these fibers can be formed by conventional processes such as melt, solution, dry and gel spinning techniques. Illustrative of suitable fiber spinning processes and melt spinning techniques and apparatus for carrying out these processes are those described in "Man Made Fibers Science and Technology", Vol. 1–3, H. F. Mark et al., Interscience, New York, 1968; "Encyclopedia of Polymer Science and Technology", Vol. 3; "Fundamentals of Fiber Formations" by Androzij Ziabiki, Wiley and Sons, New York, N.Y. (1971); "Encyclopedia of Polymer Science and Technology", Vol. 3, pps. 326–381; and U.S. Pat. Nos. 4,454,196 and 4,410,473.

In the preferred embodiments of the invention the fibers are prepared by a process of this invention. In the first step of the process of this invention, a solution of a stoichiometrically equivalent amount of an acrylonitrile polymer of fiber forming molecular weight having dispersed therein one or more metals or non-metals selected from the group consisting of B, Ti, Si, and W, a sintering effective amount of one or more effective sintering aids and a grain growth preventive amount of one or more grain growth preventive agents, said metals or non-metals, sintering aids and grain growth preventive agents being in particulate form having a particle size equal to or less than about 5 um is formed.

The relative amounts of ingredients in the solution/dispersion may vary widely. The only requirement is that the amount be sufficient to provide a fiber having the relative concentration of components described above on drying of the extruded fiber.

Useful solvents may vary widely, the only requirement is that the acrylonitrile polymer of choice is soluble in the solvent to the necessary extent. Useful and preferred solvents include dimethyl sulfoxide (DMSO), tetramethylene sulfoxide, N-methyl pyrrolidone (NMP), dimethylformamide (DMF), dimethyl-acetamide (DMAC), gamma-butyrolactone and ethylene carbonate. Other homologs and analogs of these solvents (e.g., propylene carbonate) may also be used. Less preferred are aqueous solutions of salts such as concentrated aqueous sodium thiocyanate and aqueous zinc chloride. DMF and DMSO are preferred solvents and DMF is the most preferred solvent.

In the second step of the process for preparation of the fiber, the solution is extruded through an aperture directly into or through an air gap into a quench bath. Any conventional procedure using conventional apparatus can be used. The nature of the aperture is not critical and can vary widely. Useful apertures include those of circular cross sections, oval cross sections, Y-shaped cross sections, X-shaped cross sections and the like. The diameter of the aperture is also not critical. The length of the aperture in the flow direction may vary widely. The width, depth and height of the aperture are also not critical.

The nature of the liquid in the quench bath is critical. The quench bath liquid is a mixture of one or more solvents for the acrylonitrile polymer and one or more non-solvents for the polymer, which non-solvents are miscible in the solvents. The amount of non-solvents is critical and the amount should be such that upon stretching and drying the fiber will be substantially free of voids having an average size of greater than about 0.5 um. Usually if too little non-solvent is included in the bath, the extruded solution/dispersion will not gel, coagulate or otherwise solidify into the desired fiber. If too much non-solvent is included in the bath, the extruded solution/dispersion will solidify too fast forming a sheath about the outer circumference of the fiber. The sheath prevents and retards the outflow of solvent from the interior of the fiber resulting in large voids greater than about 0.5 um in the dried and stretched fiber. In the preferred embodiments of the invention, the quench bath will preferably comprise a mixture of the first solvent and an amount of water which is sufficient to result in a gelled, coagulated or otherwise solidified fiber having the required characteristics as described above. Preferably when the metal carbide being formed is silicon carbide, the quench bath is composed of the first solvent, preferably dimethyl formamide or dimethylsulfoxide, containing from about 10 to about 60 Vol. % of water based on the total volume of liquid in the quench bath. In the particularly preferred embodiments of the invention when the metal carbide is silicon carbide, the quench bath contains a mixture of dimethyl sulfoxide or dimethyl formamide containing from about 15 to about 30 Vol. % of water based on the total volume of liquid in the quench bath, and in the most preferred embodiments of the invention when the metal carbide is silicon carbide, the quench bath contains a mixture of dimethyl sulfoxide or dimethyl formamide containing from about 18 to about 25 Vol. % of water on the aforementioned.

Some stretching during extrusion and quenching is not excluded from the present invention.

The solidified fiber resulting from extrusion and quenching consists of a polymeric network swollen with solvent. In the next step of the process of forming the fiber, the solvent swollen fiber is extracted with a second solvent using conventional solvent extraction techniques. When the first solvent is DMSO or DMF, a suitable and representative second solvent is water. Conditions of extraction preferably should remove the first solvent to less than about 1% solvent by weight of polymer in the fiber after extraction leaving the solid network of polymer substantially intact using conventional techniques and apparatus.

Stretching may be performed upon the fiber after or during quenching or during or after extraction. Alternatively, stretching of the dried fiber may be conducted, or a combination of stretching the solvent filled fiber or stretching the dried fiber may be performed. The first stage stretching may be conducted in a single stage or it may be conducted in two or more stages. The first stage stretching may be conducted at room temperature or at an elevated temperature. Preferably stretching is conducted in two or more stages with the last of the stages performed at a temperature between 80° C. and 275° C. Most preferably stretching is conducted in more than two stages with the last of the stages performed at a temperature between 90° C. and 150° C. Such temperatures may be achieved with heated tubes or with other heating means such as heating blocks or steam jets.

In the next steps of the process, the fibers are subjected to various heat treatments to carbonize the stabilized fiber into carbon fiber containing metal or non-metal particles with the required carbon to metal atom ratio, to react the metals or non-metals and carbon to form metal or non-metal carbide fiber, and to sinter the metal carbide fiber to remove all or a portion of the voids in the fiber and to form a metal or non-metal carbide fiber of the desired density and having the desired crystallite size. In the carbonization heating step, the stabilized fiber is carbonized into carbon fibers containing carbon and the metals or non-metals having the required carbon to metal atom ratio by heating the stabilized fiber in an inert atmosphere. During carbonization all or substantially all non-carbon elements present in the stabilized fiber are eliminated in the form of volatiles. The carbonized fiber is preferably free or substantially free of voids and of impurities. Carbonization temperatures and times may vary widely. In general, carbonization temperatures are from about 350° C. to about 1400° C. and carbonization times are from about 0.25 hr. to about 4 hrs. In the preferred embodiments of the invention, carbonization temperatures are from about 375° C. to about 1300° C. and carbonization times are from about 0.25 hr. to about 3 hr., and in the particularly preferred embodiments of the invention carbonization temperatures are from about 400° C. to about 1250° C. and carbonization times are from about 0.25 hr. to about 2 hrs. Amongst these particularly preferred embodiments, most preferred are those embodiments in which the carbonization temperature is from about 400° C. to about 1250° C. and carbonization times are from about 0.5 hr. to about 1.5 hr.

As in the case of stabilization, in carbonization the stabilized fiber is preferably heated at more than one temperature within the range. For example, in these preferred embodiments of the invention, the stabilized fiber is initially heated at a temperature at the lower end of the above referenced temperature range and the temperature is increased stepwise or gradually at a constant or substantially constant rate to a temperature at the higher end of the range to control the rate of carbonization. In the preferred embodiments of the invention, the fiber is carbonized by initially heating the fiber for from about 0.25 hr. to about 0.5 hr. at a temperature of from about 350° C. to about 450° C. and thereafter increasing the temperature gradually at a constant or substantially constant rate or stepwise to a final temperature of from about 1000° C. to about 1400° C., more preferably from about 1200° C. to about 1350° C. where the fiber is heated until carbonization is essentially complete.

Carbonization is carried out in an atmosphere which is inert or substantially inert under carbonization conditions. Useful atmospheres may vary widely. Use of oxygen in the atmosphere may result in the formation of metal oxides. This reaction reduces the amount of carbon available for reaction with the metals or non-metals in the subsequent reacting step, which results in a metal carbide fiber having metal or non-metal impurities. The preferred inert atmosphere is argon.

In the reaction heating step, the carbonized fiber is converted into metal or non-metal carbide fiber by reaction of the metals or non-metals and carbon. Temperatures and heating times may vary widely. The reacting step can be carried out in a single discrete step or can be carried out jointly as a part of the sintering step. In general, the carbonized fiber is heated in an inert or substantially inert atmosphere at a temperature and time sufficient to react all or substantially all of the metals or non-metals to form the corresponding metal or non-metal carbide having a density of at least about 60% of the theoretical density of the metal or non-metal carbide. The reaction of carbon and metals or non-metals which may be present may require time periods up to about 1 hr. to go to completion. In the preferred embodiments of the invention, the metals or non-metals are reacted by heating the carbonized fiber to a temperature of from about 1000° C. to about 2000° C., until all or substantially all of the metals or non-metals have been reacted to form the metal or non-metal carbide fiber having the desired density, usually for from about 0.10 hr. to about 1 hr. is formed. The fiber can be heated at a single temperature or at two or more different temperatures within the range. In the particularly preferred embodiments, the fiber is heated at a temperature within the range of from about 1200° C. to about 1900° C. for a period of from about 0.25 hrs. to about 1 hr. and in the more preferred embodiments of the invention, the fiber is heated to a temperature of from about 1200° C. to about 1650° C. most preferably from about 1250° C. to about 1600° C. until the reaction is essentially complete and metal or non-metal carbide of the required density is formed.

As in the case of carbonization and stabilization the fiber is preferably heated under tension to avoid shrinkage in the reaction of the non-metals or metals and the carbon. The metals or non-metals and carbon have a lower density than the metal or non-metal carbide so that the reaction of the metals or non-metals and carbon results in voids. In general, the average size of the voids is equal to or less than about 2 um and a crystallite size of less than about 1 um. In the preferred embodiments of the invention, the average size of the voids is equal to or less than about 1 um and a crystallite size of less than about 0.5 um; and in the particularly preferred embodiments average void size is equal to or less than about 0.5 um and a crystallite size of less than about 0.1 um. Amongst these particularly preferred embodiments, most preferred are those embodiments in which average void size is equal to or less than about 0.3 um; and a crystallite size equal to or less than about 0.05 um.

In the final heating step, the metal or non-metal carbide fiber is sintered and densified. In general, the metal or non-metal carbide fiber is heated in an inert or substantially inert atmosphere for a time and at a temperature sufficient to form a metal or non-metal carbide fiber having a density of greater than about 85% of the theoretical density of the metal or non-metal carbide. Theoretical density values for metal or non-metal carbides are well known in the art and can be determined by known methods or obtained from Handbook of Chemistry and Physics, 66 Ed., CRC Press, Boca Raton, Fla. In the preferred embodiments of the invention, the metal or non-metal carbide fibers are heated for a time and at a temperature sufficient to provide a metal or non-metal carbide fiber having a density equal to or greater than about 90% of the theoretical density of the metal or non-metal carbide, and in the particularly preferred embodiments of the invention the metal or non-metal carbide fibers are heated for a time and at a temperature sufficient to provide a metal or non-metal carbide fiber having a density greater than 95% of the theoretical density of the metal or non-metal carbide. Amongst these particularly preferred embodiments of the invention, most preferred are those embodiments of the invention in which the metal or non-metal carbide fibers are heated for a time and at a temperature sufficient to provide a metal or non-metal carbide fiber having a density of from about 98% to about 99.9% of the theoretical density of the metal or non-metal carbide.

In the preferred embodiments of the invention, the metal or non-metal carbide fiber is sintered by heating for from about 0.5 hrs. to about 4 hrs. at a temperature in excess of about 1500° C. in an inert or substantially inert atmosphere. In the particularly preferred embodiments, the metal or non-metal carbide fiber is sintered by heating at a temperature of from about 1500° C. to about 2500° C. for from about 0.5 hrs. to about 2 hrs., and in the most preferred embodiments the metal or non-metal carbide is sintered by heating at a temperature of from about 1500° C. to about 2200° C. for from about 0.5 hrs. to about 1.5 hrs.

The metal or non-metal carbide fiber can be sintered by heating at a single temperature within the temperature range, or by heating at two or more temperatures within the range. In the particularly preferred embodiments, the metal or non-metal carbide fiber is heated at two or more temperatures within the range of from about 1500° C. to about 2300° C. In the initial heating, the fiber is heated to a temperature within the lower end of the range such as from about 1500° C. to about 1600° C., for from about 0.5 hrs. to about 1 hr. The temperature is then increased gradually at a constant or substantially constant rate or stepwise as a function of time (usually over a period of from about 0.2 hrs. to about 1 hr.) to a temperature in the higher end of the range such as from about 2000° C. to about 2200° C. and maintained there until the metal carbide of the required density is obtained usually of from about 0.5 hrs. to about 1 hr. As in the case of carbonization, stabilization and the reacting step, the fiber is heated under tension.

The stabilization, carbonization, reacting and sintering can be carried out using a conventional technique and furnaces for carbonization of acrylonitrile polymers. Illustrative of such techniques and apparatuses are those described in "Carbon Fiber" by Jean Baptiste Bonnet and Roop Chand Bansal, International Fiber Science Technology Series, Vol. 3, Marcel Dekker, Inc., New York, N.Y. 1984.

The metal or non-metal carbide fiber formed by the process of this invention in general will exhibit a density equal to or greater than about 85% of the theoretical density of such material. In the preferred embodiments of the invention the metal or non-metal carbide fibers will have a density equal to or greater than about 90% of the theoretical density of the metal or non-metal carbide, and in the particularly preferred embodiments of the invention the metal or non-metal carbide fibers will have a density of from about 99% to about 99.99% of the theoretical density of the metal or non-metal carbide. Amongst these particularly preferred embodiments of the invention most preferred are those embodiments of the invention in which the density of the metal or non-metal carbide fiber is from about 98% to about 99.99% of the theoretical density of the metal or non-metal carbide.

The diameter, tenacity and tensile modulus of the metal or non-metal carbide fiber of this invention may vary widely. In the preferred embodiments of the invention, the cross-sectional diameter of the fiber is from about 5 um to about 100 um, the tenacity of the fiber is from about 1.4 GPa to about 6.5 GPa, and the tensile modulus of the fiber is from about 135 GPa to about 700 GPa. In the particularly preferred embodiments of the invention, the fiber diameter is from about 10 um to about 80 um, fiber tenacity is from about 2.5 GPa to about 4.56 GPa and the tensile modulus is from about 300 GPa to about 550 GPa, and in the most preferred embodiments of the invention, the fiber diameter is from about 25 um to about 50 um, fiber tenacity is from about 3.5 GPa to about 4.0 GPa and tensile modulus is from about 350 GPa to about 450 GPa.

The process of this invention can be carried out in a continuous, semi-continuous or batch fashion. The fiber substrate for heat treatment may be introduced into process zones batchwise or it may be continuously or intermittently introduced into such zones during the course of the process. The process can be conducted in a single heating zone, or in a plurality of such zones, in series or in parallel.

According to the present invention, metal carbide fibers having increased strength can be obtained with great ease and low cost as compared with conventional methods. Metal or non-metal carbide fibers prepared by the process of this invention are utilizable, solely or in combination with other materials, for a wide range of uses such as reinforcing fibers for metals and plastics.

The following specific examples are presented to more particularly illustrate the invention and are not to be construed as limitations thereon.

EXAMPLE I

Figure 2:
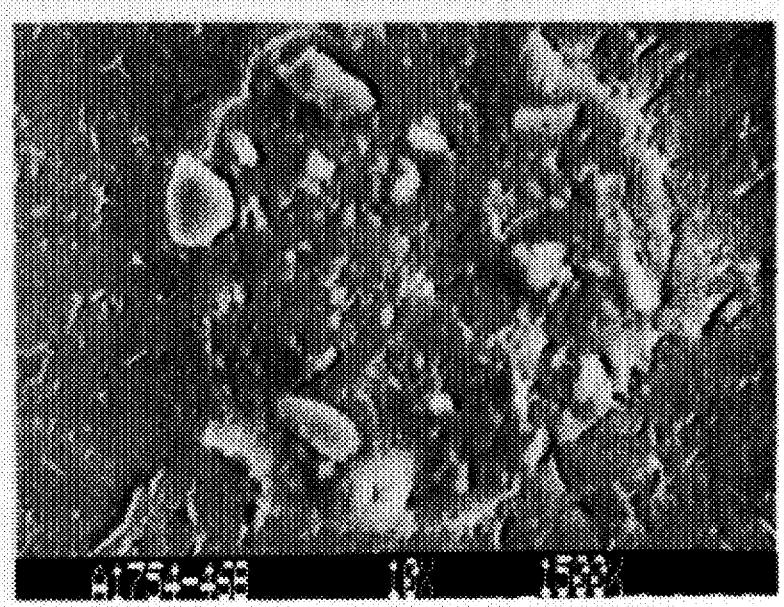

Silicon (average particle size 1.8 um, 99% pure) (365 gm), 5.5 gm of boron (average particle size 0.05 um), and dimethylformamide (DMF) (2000 ml) were blended using Waring blender at 23,000 rpm for 20 min and transferred in a 5 liter glass vessel, and heated to 100° C. under Nitrogen atmosphere while being stirred with a high torque mechanical stirring unit. To this solution was added powder polyacrylonitrile (PAN) 400 gram in a small portion over a two hour period. The mixture was then stirred at 100° C. for 20 hr. to obtain complete dispersion of silicon and boron in the PAN/DMF solution. The viscosity of the dispersed mixture was 400 to 450 poise (40 Pa.s to 50 Pa.s) at room temperature. This viscous liquid was degassed to remove air bubbles and was fed into a spinneret (104 holes, hole diameter 10 mil (254 um)) using a zeneth precision metering pump, and spun into a coagulation bath consisting of 80:20 (v/v) of DMF/$H_2O$ which was maintained between 12° C. to 14° C. The coagulated fiber was washed in a 8' (243.8 cm) water bath using counter-current water flow and then taken up on the first godet. The gel stretch was maintained about 1.6 to 1.8. The fiber was then stretched passing through 1' (30.48 cm)

steam chest, at 110° C., and taken-up on the second godet. The fiber was then dried in an air-jet and spooled on a bobbin using a winder. Under these conditions, the fiber was stretched 8×, 10×, 12×, and 14×. Depending upon stretched condition, fiber tenacity varied from 1.2 gm/d to 2.5 gm/d (154 MPa to 322 MPa). Fiber had 1 to 10% elongation at break. The scanning electron microscope (SEM) analysis of the dried and drained fiber indicated uniform distribution of silicon and boron in a PAN matrix. (See FIGS. 1 and 2)

The fiber was stabilized using a tubular oven. Fiber yarn was taken-up on an input godet and passed through a 4 zone tubular oven. The four zone temperatures were 175° C., 225° C., 250° C. and 285° C. respectively. Each zone was 10' (254 cm) long and temperature was controlled independently. Heating time for stabilization was about 130 min to about 150 min. The fiber yarn was then taken up on a out-put godet and spooled by a winder. Air was passed through oven, and fiber shrinkage was controlled by input and output godet velocity. An optimum fiber shrinkage was found to be about 8 to 10%. The stabilized fiber has a tenacity of about 1.0 gm/d (137 MPa) to 1.2 gm/d (165 MPa) and an elongation at break of about 3 to 5%.

Figure 3:
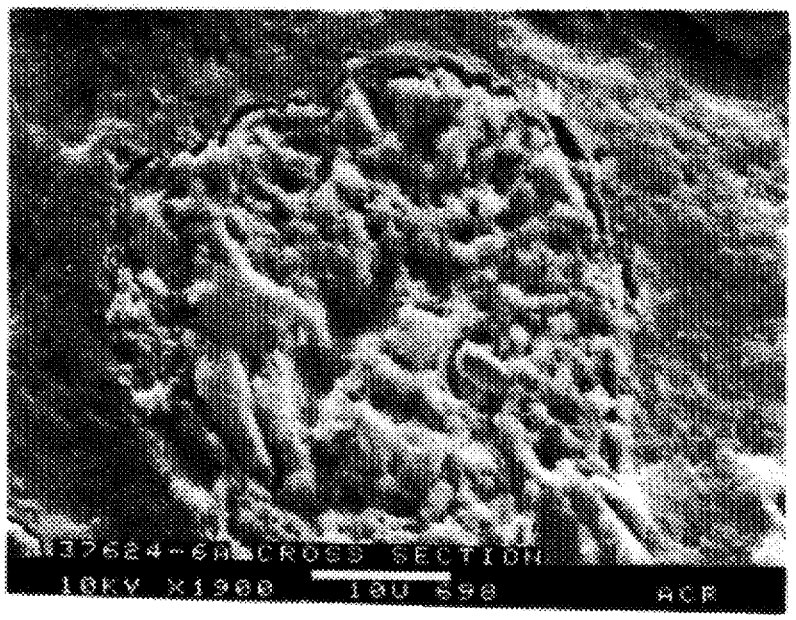
FIG. 3 is a photograph of a cross-section of the carbonized fiber of Example I having dispersed silicon and boron taken by a scanning electron microscope (SEM).

The stabilized fiber yarn was carbonized using gradient temperature condition. The fiber was fed from the input godet into a 12" (30.48 cm) pre-heated furnace which was maintained at 400° C. The fiber was then passed through a 3 zone furnace; zones 1, 2 and 3 were maintained at 700° C., 1000° C. and 1300° C., respectively. Each zone was about 12" (30.48 cm) long, a 1" (2.54 cm) I.D. quartz tube and purified argon was used as a cover gas. The argon was purified using a getrerip furnace. Fiber was taken up on an output godet and spool on a bobbin using a winder. Fiber tension was maintained by controlling input and output godet velocity. The total carbonization time was about 50 to 60 min. Analysis by SEM indicated that the carbonized fiber produced had a void-free cross-section. (See FIG. 3)

Figure 4:
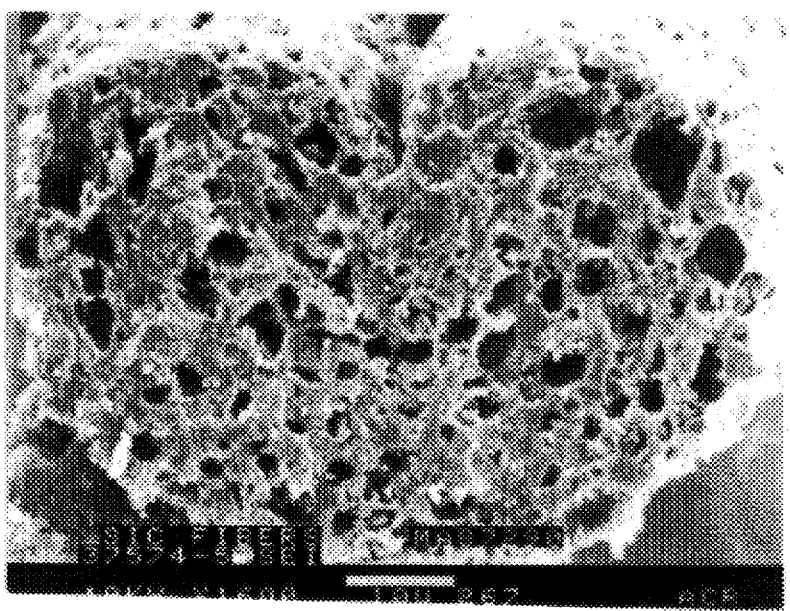
FIG. 4 is a photograph of a cross-section of the silicon carbide fiber of Example I taken by a scanning electron microscope (SEM).

The carbonized Si/PAN fiber was passed into a carbonization furnace to form silicon carbide fiber. The carbonized fiber was fed from the input godet into a 12" (30.48 cm) preheated oven maintained at 400° C. The fibers then passed through a 3 zone furnace having a quartz tube. Zones 1, 2, and 3 were maintained at 800° C., 1250° C. and 1450° C., respectively. Purified argon gas was used as a cover gas. The SEM of the cross-section of the silicon carbide fiber indicated many voids. (See FIG. 4). The fiber exhibits a density of about 1.6 to 2.1 gm/cm³, which is 50 to 63% of the theoretical density of silicon carbide. X-ray diffraction analysis indicated formation of β-SiC.

The silicon carbide fiber is fed into a high temperature furnace using a device similar to that in carbonization unit. The temperature of the first furnace is approximately at 1550° C. and the temperature of the second furnace is approximately 2075° C. A quartz tube and purified argon is used as a cover gas. The speed of the pick-up godet is adjusted to allow residence time in each furnace of about ½ hr. The spooling mechanism is the same as in the carbonization and stabilization process. The resulting silicon carbide fiber exhibits a density which is 99.99% of the theoretical density of silicon carbide, a tenacity of about 3.5 GPa and a tensile modulus of about 427 GPa.

COMPARATIVE EXAMPLE I

Figure 5:
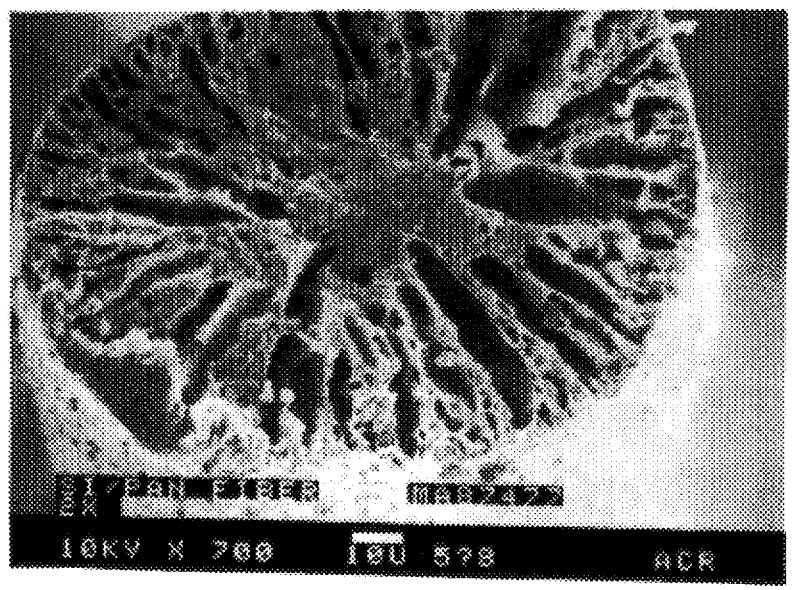
FIGS. 5 and 6 are photographs of cross-sections of the polyacrylonitrile fiber of Comparative Example I which has been dried and drawned taken by a scanning electron microscope.
Figure 6:

A silicon carbide fiber was prepared using the procedure of Example I except that a quench bath containing 60 Vol. % DMF and 40 Vol. % water was used. The cross-section of the dried and drained silicon/PAN fiber and the sintered fiber are set forth in FIGS. 5 and 6 respectively. As shown in FIG. 5, the dried fiber contains a large number of large voids and as shown in FIG. 5 the drained fiber has collapsed into an unacceptable mass on stretching.

COMPARATIVE EXAMPLE II

Figure 7:
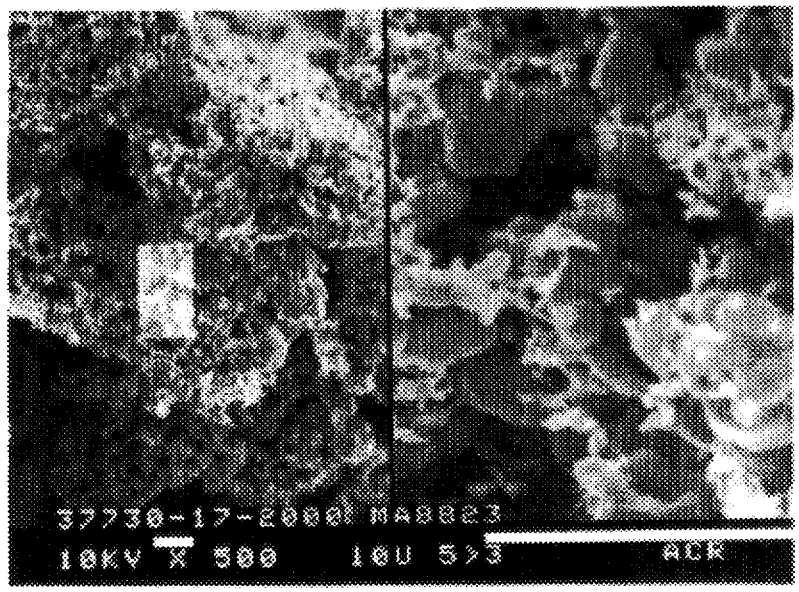
FIG. 7 is a photograph of a cross-section of the silicon carbide fiber of Comparative Example I taken by a scanning electron microscope.

A silicon carbide fiber was prepared using the procedure of Example I, except that no sintering aid or grain growth preventive agent was used, the carbon and silicon were reacted at 1406° C. to form silicon carbide, and sintered at 2050° C. A photograph of the cross-section of the sintered fiber is set forth in FIG. 7. As is shown in the FIG. 7, the sintered silicon carbide fiber contained a large number of large voids, and had no strength.

What is claimed:

1. A process for forming metal or non-metal carbide fiber comprising the steps of:
   (a) stabilizing a fiber comprising at least a stoichiometrically effective amount of an acrylonitrile polymer of fiber forming molecular weight having uniformly or substantially uniformly dispersed therein one or more metals or non-metals selected from the group consisting of B, Ti, Si, and W, a sintering effective amount of one or more effective sintering aids and a grain growth preventive amount of one or more grain growth preventive agents, said metals or non-metals, sintering aids and grain growth preventive agents in particulate form having an average particle size of less than about 5 um and said fiber substantially free or free of voids having an average size greater than about 1 um by heating said fiber in an oxidizing atmosphere at a temperature and for a time sufficient to form said stabilized fiber;
   (b) carbonizing said stabilized fiber by heating said fiber in an inert atmosphere or substantially inert atmosphere at a temperature and for a time sufficient to form a carbonized fiber comprising carbon, metals or non-metals, said sintering aids and said grain growth preventive agents;
   (c) reacting said carbon and said metals or non-metals in said carbonized fiber by heating said fiber in an inert atmosphere or substantially inert atmosphere at a temperature and for a time sufficient to form a fiber comprising the metal carbide having a density of at least about 60% of the theoretical density of said metal or non-metal carbide; and
   (d) sintering said fiber comprising said metal carbide by heating said fiber in an inert atmosphere or substantially inert atmosphere for a time and at a temperature sufficient to form metal or non-metal carbide fiber having a density of greater than about 70% of the theoretical density of the metal or non-metal carbide.

2. A process for forming metal or non-metal carbide fibers which comprises:
   (a) forming a solution of at least a stoichiometrically equivalent amount of an acrylonitrile polymer of fiber forming molecular weight in a first solvent, said solution having a dispersed one or more metals selected from the group consisting of B, Ti, Si, and W, a sintering effective amount of one or more effective sintering agents and a grain growth preventive amount of one or more grain growth preventive agents, said metals or non-metals, sintering aids, and grain growth preventive agents in particulate form having an average particle size of less than about 5 um;
   (b) extruding said solution through a spinneret into a quench liquid comprising said first solvent and a liquid which is miscible in said first solvent and in which said polymer is insoluble or substantially insoluble to solidify said solution to form a fiber containing said first solvent;

(c) extracting the fiber containing said first solvent with a second solvent for a time sufficient to form an extracted fiber which is free or substantially free of said first solvent and which is free or substantially free of voids having a size greater than about 1 um, said extracted fiber having a substantially uniform or uniform distribution of said metals, sintering aids and grain growth preventive agents in said fiber;

(d) stretching at least one of:
  (i) the fiber containing said first solvent; or
  (ii) the extracted fiber;

(e) stabilizing said extracted fiber by heating said fiber in an oxidizing atmosphere at a temperature and for a time sufficient to form a stabilized fiber;

(f) carbonizing said stabilized fiber by heating said fiber in an inert atmosphere or substantially inert atmosphere at a temperature and for a time sufficient to form a carbonized fiber comprising carbon and said metals or non-metals, sintering aids and grain growth preventive agents;

(g) reacting said carbon and metals or non-metals by heating said carbonized fiber in an inert atmosphere or substantially inert atmosphere for a time and at a temperature sufficient to form a metal or non-metal carbide fiber having a density equal to or greater than about 60% of the theoretical density of said metal or non-metal carbide; and (h) sintering said metal or non-metal carbide fiber comprising said metal or non-metal carbide by heating said fiber in an inert atmosphere or substantially inert atmosphere for a time and at a temperature sufficient to form a metal or non-metal carbide fiber having a density equal to or greater than about 70% of the theoretical density of the metal or non-metal carbide.

3. A process according to claim 2 wherein said metal or non-metal is silicon.

4. A process according to claim 2 wherein said first solvent is selected from the group consisting of dimethyl formamide and dimethyl sulfoxide.

5. A process according to claim 4 wherein said first solvent is dimethyl formamide.

6. A process according to claim 2 wherein said acrylonitrile polymer is polyacrylonitrile.

7. A process according to claim 1 wherein said quench liquid comprises said first solvent and from 10 to 60 Vol. % water based on the total volume of liquid in the quench bath.

8. A process according to claim 7 wherein said quench liquid comprises said first solvent and from about 15 to about 30 Vol. % water.

9. A process according to claim 8 wherein said first solvent is dimethyl sulfoxide or dimethyl formamide.

10. A process according to claim 9 wherein said quench liquid comprises from about 18 to about 25 Vol. % water.

11. A process according to claim 2 wherein said second solvent is water.

12. A process according to claim 2 wherein said fiber is stabilized by heating said fiber at a temperature of from about 125° C. to about 325° C. for a period of from about 0.25 hrs. to about 4.5 hrs.

13. A process according to claim 12 wherein said fiber is stabilized by heating at a temperature of from about 150° C. to about 325° C. for a period of from about 1 hr. to about 3.5 hrs.

14. A process according to claim 13 wherein said stabilized fiber is carbonized by heating said fiber at a temperature of from about 350° C. to about 1400° C. for a period of from about 0.25 hr. to about 4 hrs.

15. A process according to claim 14 wherein said stabilized fiber is carbonized by heating said fiber at a temperature of from about 375° C. to about 1300° C. for a period of from about 0.25 hr. to about 3 hrs.

16. A process according to claim 2 wherein said carbonized fiber is heated at a temperature of from about 700° C. to about 1600° C. for a period of from about 0.25 hr. to about 1 hr. to react all or substantially all of the metal or non-metal in said fiber to form the corresponding metal or non-metal carbide.

17. A process according to claim 1 wherein said metal or non-metal carbide fiber has a density equal to or greater than about 90% of the theoretical density of said metal or non-metal carbide.

18. A process according to claim 17 wherein said metal or non-metal carbide fiber has a density equal to or greater than about 95% of the theoretical density of said metal or non-metal carbide.

19. A process according to claim 18 wherein said metal or non-metal carbide fiber has density equal to or greater than about 98% to about 99.9% of the theoretical density of said metal or non-metal carbide.

20. A process according to claim 1 wherein the amount of said sintering aids and grain growth prevention agents is equal to or less than about 5% by weight of the metal or non-metal carbide in the fiber after the metal or non-metal oxide and carbon reaction step.

21. A process according to claim 20 wherein said amount is equal to or less than about 2% by weight.

22. A process according to claim 21 wherein said amount is equal to or less than about 1.5% by weight.

23. A process according to claim 1 wherein the amount of polymer in said fiber is an amount sufficient on carbonization to provide an excess of up to about 5% by weight carbon based on the amount of carbon required to react with all of the metal oxide in the fiber to form the corresponding metal carbide.

24. A process according to claim 23 wherein the amount of said excess in form about 0.25 to about 3% by weight.

25. A process according to claim 24 wherein the amount of said excess is from about 0.5 to 3% by weight.

26. A process according to claim 25 wherein the amount of said excess is from about 1 to about 2% by weight.

* * * * *